United States Patent [19]
Hassner et al.

[11] Patent Number: 5,748,023
[45] Date of Patent: May 5, 1998

[54] INTEGRATOR WITH OUTPUT-COMPENSATING CAPABILITY

[76] Inventors: Martin Hassner, 1610 Portola Ave., Palo Alto, Calif. 94306; Seiji Koyama, 3-25-6-201, Chuorinkan, Yamato-shi, Kanagawa-ken, Japan; Tohru Nozawa, 4-9, Yutaka-chou, Sagamihara-shi, Kanagawa-ken, Japan; Asao Terukina, 8-27-13-201, Kamishoyagi, Yamato-shi, Kanagawa-ken, Japan; Tamura Tetsuya, 1-7-1, Tsukimino, Yamato-shi, Kanagawa-ken, Japan

[21] Appl. No.: 668,887

[22] Filed: Jun. 24, 1996

[30] Foreign Application Priority Data

Aug. 18, 1995 [JP] Japan .................................. 7-210339

[51] Int. Cl.⁶ .................................................. G06G 7/64
[52] U.S. Cl. ............................ 327/336; 327/341; 327/344
[58] Field of Search .................................. 327/336, 337, 327/339, 341, 344, 345, 553, 362, 58, 91, 93; 360/65, 67, 68

[56] References Cited

U.S. PATENT DOCUMENTS 3,714,581  1/1973  Sage ................................ 327/339
4,818,903  4/1989  Kawano ........................... 327/553
4,851,719  7/1989  Hitomi ............................. 327/553

OTHER PUBLICATIONS

J. L. Walsh, "A Closed Set of Normal Orthogonal Functions", American Journal of Mathematics, vol. 45, 1923, pp. 5–24. No Month.

*Primary Examiner*—Toan Tran
*Attorney, Agent, or Firm*—Khanh Q. Tran

[57] ABSTRACT

An integrator is disclosed that is capable of outputting the same integration result with respect to the same bit pattern even if there are fluctuations in the integrating period, semiconductor device process, or the power supply voltage. The disclosed integrator includes: (1) a first integrator having a first amplifier, for integrating a reference voltage during an integrating period, (2) a second integrator having a second amplifier, for integrating an input signal during the integrating period, and (3) control means for outputting a signal regulating a gain of the first amplifier to the first amplifier so that an output of the first integrator varies in correspondence with the integrating period, and for regulating a gain of the second amplifier by means of the signal.

7 Claims, 5 Drawing Sheets

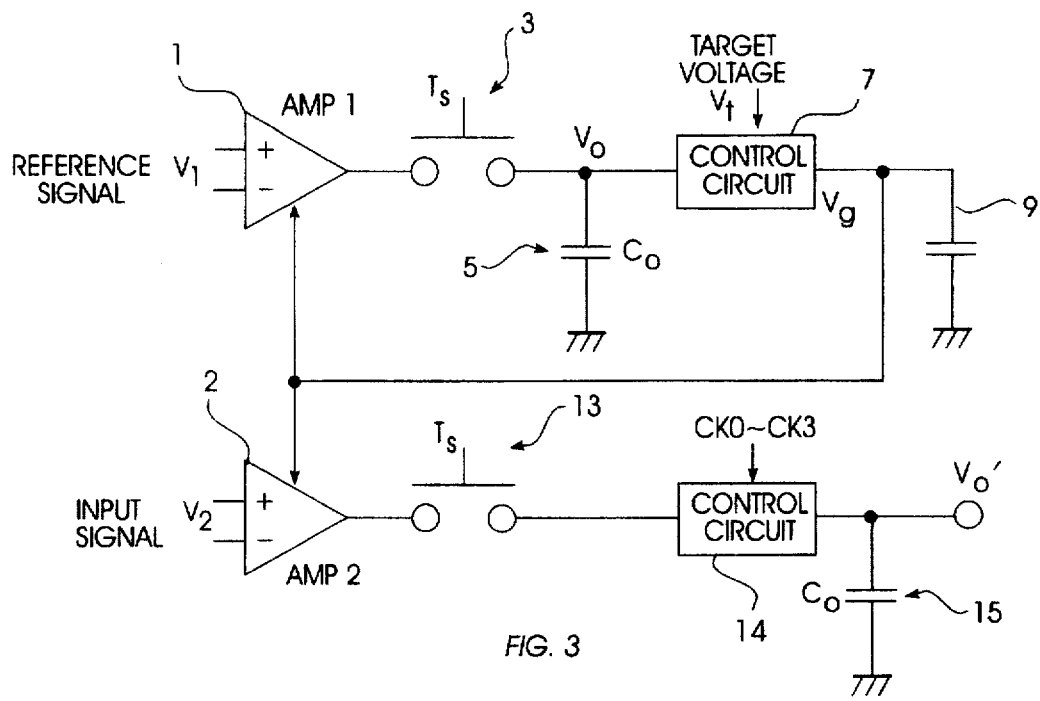
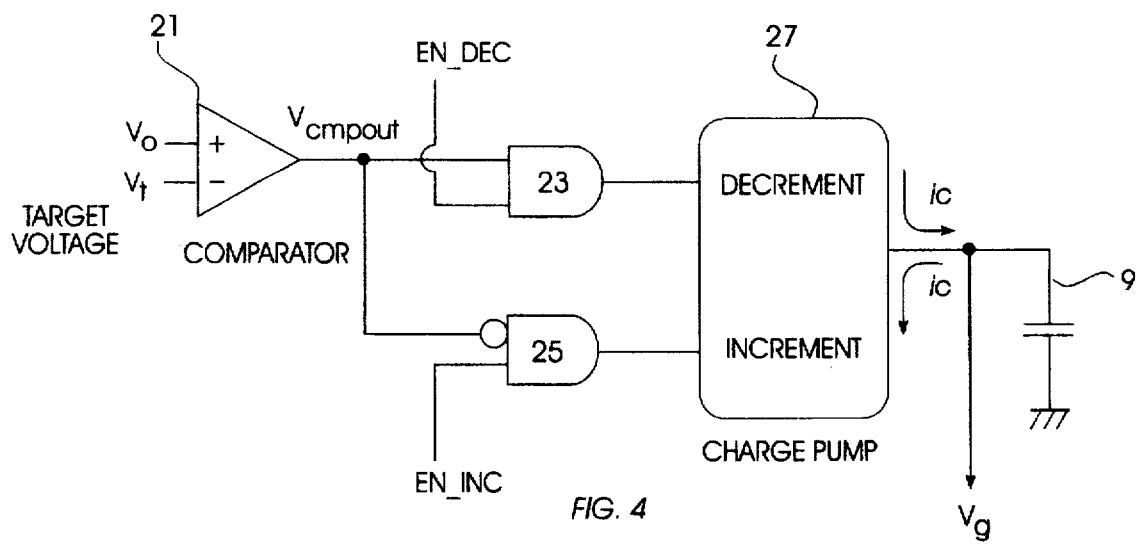

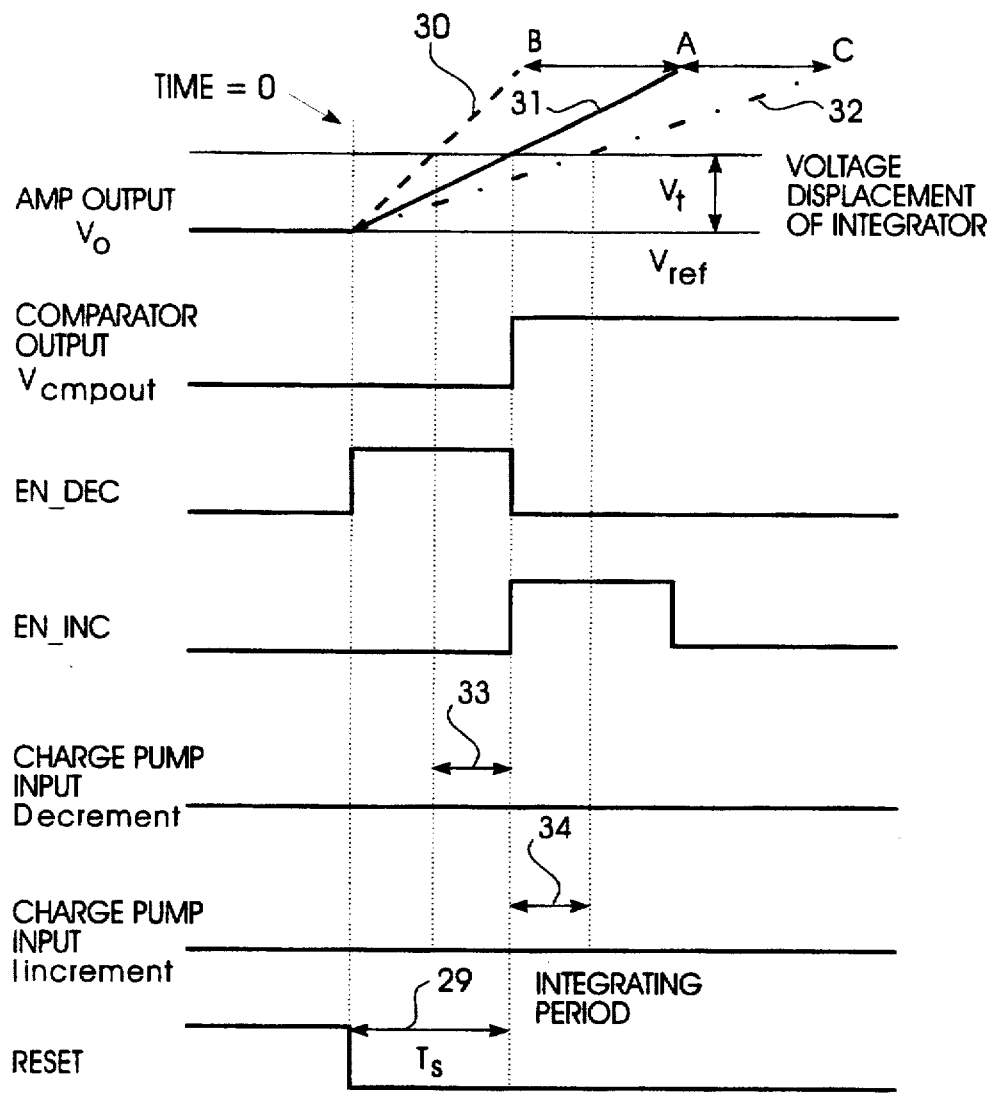

INTEGRATOR WITH OUTPUT-COMPENSATING CAPABILITY

FIELD OF INVENTION

The present invention relates to an integrator for signal processing for use in a magnetic recording system, and more particularly, to an integrator capable of compensating its output.

BACKGROUND OF THE INVENTION

A peak detection method has so far been used in magnetic recording, but a new technique, called PRML (partial response maximum likelihood), has recently been used in order to realize higher density and higher speed. The PRML technique, however, requires a high-speed analog-digital converter and a large-scale digital circuit for calculating a likelihood function and therefore has the disadvantage that it consumes a large amount of power as compared with the conventional peak detection method. Then, there has been proposed a symbol detection channel method which improves this disadvantage and performs high-speed signal processing.

The symbol detection channel method, unlike the prior art, does not require an analog-digital converter and a large-scale digital circuit because signal processing is performed with a value obtained by converting an analog signal at units of symbol by Walsh transform, including integration. The symbol detection channel method has also realized higher-speed signal processing by parallel calculation. This method, for the case where one symbol equals 4 bits, will be briefly described with reference to FIGS. 1 and 2a through 2f. A head 101 reads out a magnetic signal, for example, from a magnetic disk 119 and converts the magnetic signal to an electric signal. The head 101 is connected to an automatic gain control (AGC) 102. The AGC 102 is connected to an equalizer 104, which in turn is connected to integrator sections 1 through 4.

The integrator sections 1 through 4 consist, respectively, of integrators 103a and 103b, integrators 105a and 105b, integrators 107a and 107b, and integrators 109a and 109b. The suffixes a and b are used to denote the two integrators in each integrator section, which are alternately employed. The integrators 103a through 109b are connected to a multiplexer 111. The multiplexer 111 is constructed so that the outputs of the integrators 103a through 109b are distributed to 12 product-sum arithmetic units comprising product-sum arithmetic units 113a through 113l, in a previously selected manner. The product-sum arithmetic units 113a through 113l are connected to a comparator group 115 constituted by 24 comparators. The output of this comparator group 115 is processed by a digital signal processing unit 117, and a digital output is output to subsequent processing.

In this system, the head 101 first converts a magnetic field to an electric signal and outputs an analog signal, as described above. This analog signal is converted to an appropriate signal through the AGC 102 and the equalizer 104. The AGC 102 and the equalizer 104 are well known in the conventional art and therefore a description of them is omitted. The signal from the equalizer 104 has, for example, a waveform such as that shown in FIG. 2b. This analog signal is output to the integrator sections 1 through 4. The integrating period and the polarity of the integrator section 1 are shown in FIG. 2c. FIGS. 2d, 2e, and 2f illustrate the window functions of the integrator sections 2 through 4, respectively. That is, the integrator section 1 (103a and 103b) has a period of $T_s$ during which integration is performed with a plus polarity as shown in FIG. 2c. The period $T_s$ is referred to as a period where a signal of 4 bits is read out (see FIG. 2a). Also, the integrator section 2 (105a and 105b) has an integrating period with a plus polarity and an integrating period with a minus polarity during the period $T_s$, as shown in FIG. 2d. Likewise, the integrator section 3 (107a and 107b) and the integrator section 4 (109a and 109b) have an integrating period with a plus polarity and an integrating period with a minus polarity.

The reason each of the integrator sections 1–4 consists of two integrators is that an integrated value of two consecutive symbols (i.e., 8-bit signal) is used to decode a signal of 1 symbol in view of intersymbol interference. More specifically, the b-suffix integrator (e.g., 107b) is used to integrate during the next integrating period $T_s$ of the a-suffix integrator (e.g., 107a). With such a configuration, the Walsh transform complying with a Walsh function will be executed. For a detailed description of this Walsh function, the reader is referred to "A Closed Set of Normal Orthogonal Functions," J. L. Walsh, American Journal of Mathematics, Vol. 45, pp. 5–24, 1923.

The analog outputs of the integrators are distributed to the product-sum arithmetic unit group by the multiplexer 111. Accordingly, the integration results are different between the product-sum arithmetic units, depending on the integrator output used by each unit. For example, the product-sum arithmetic units 1 through 3 use the results of the integrators 103a, 103b, 105a, 107a, and 109a. The product-sum arithmetic units 4 through 6 use the results of the integrators 103b, 105a, 105b, 108a, and 109a. The product-sum arithmetic units 7 through 9 use the results of the integrators 103b, 105b, 107a, 107b, and 109a. The product-sum arithmetic units 10 through 12 use the results of the integrators 103b, 105b, 107b, 109a, and 109b. Then, in each product-sum arithmetic unit, the aforementioned necessary integration results are multiplied and added in an analog manner using necessary coefficients which have been previously set. The output of each product-sum arithmetic unit is output to the comparator group 115.

The comparator group 115 determines if the output of each product-sum arithmetic unit is within a predetermined range. More specifically, 6 comparators are provided for each of the product-sum arithmetic units 1 through 3, the product-sum arithmetic units 4 through 6, the product-sum arithmetic units 7 through 9, and the product-sum arithmetic units 10 through 12, and each comparator determines whether the output of the product-sum arithmetic unit belonging to each group is within a predetermined range. The result of the determination is output as a digital signal. In order to determine if the output is within a predetermined range, the output is compared to a predetermined reference level.

With the output from the comparator group 115, the digital signal processing unit 117 performs processing for removing intersymbol interference and outputs a digital signal output representative of a normal bit string of 0 or 1 (bit string of run-length-limited code, RLL) to subsequent processing. For a detailed description on such a digital signal processing, the reader is referred to the assignee's pending U.S. patent application Ser. No. 08/489,863 for "Maximum-Likelihood Symbol Detection For RLL-Coded Data."

Accordingly, analog signals are integrated in parallel, and the product-sum arithmetic results of the integration output are compared by the comparators. One problem with the prior art is that if the output of the integrator is shifted for some reason, the reference level of the comparator has to be varied in correspondence with the shift. However, it is usually very difficult to vary the reference level. Also, the read speed of a magnetic disk is typically not constant because of maximization of capacity and optimization of performance. This is due to the fact that the inner side and the outer side of a disk are different in recording density. In addition, such circuits are usually integrated into a semiconductor device, and it is expensive to control variations in semiconductor processing and power supply voltage with a high degree of accuracy.

In a typical prior art integrator, the value of integration can be changed only if the integrating period is changed.

In addition, there is a known technique called AGC (automatic gain control) which makes the output of the integrator constant. This technique, however, does not address the time component and cannot make a compensation for time-dependent integrated values.

SUMMARY OF THE INVENTION

An objective of the present invention is to provide an integrator which is capable of outputting the same output with respect to the same symbol (same bit pattern) independently of the data reading speed, variations in the semiconductor process, and fluctuations in the power supply voltage.

Another objective is to perform compensation for the aforementioned data reading speed and semiconductor process quickly and automatically.

Still another objective is to make high-speed signal processing possible.

To achieve the foregoing objectives, the present invention is constructed as follows. The invention comprises a first integrator, a second integrator, and control means. The first integrator includes a first amplifier for integrating a reference voltage during an integrating period. The second integrator has a second amplifier for integrating an input signal during the integrating period. The control means outputs a signal regulating a gain of the first amplifier to the first amplifier so that an output of the first integrator varies in correspondence with the integrating period, and regulates a gain of the second amplifier using the control signal. With this configuration, the same integration of an input bit pattern may be output in spite of variations in the semiconductor device process or the power supply voltage, since the gains of the first and second amplifiers can be compensated for.

The first integrator may further have a capacitor and means for supplying an initial voltage to said capacitor.

Also, the control means may comprise means for supplying a base voltage, and means for generating the signal in correspondence with time until the output of the first integrator reaches the base voltage.

In addition, the first amplifier and the second amplifier may be equal in characteristic and the signal may be inputted to the first and second amplifiers.

Furthermore, the means for generating the signal may comprise a comparator for comparing the base voltage and the output of the first integrator, means for determining when an output of the comparator is activated, a capacitor, and means for charging or discharging the capacitor when the output of the comparator is activated as detected by the determining means.

The operation of the aforementioned circuit will be described next. The first amplifier amplifies a reference voltage, and electric charges are charged into a capacitor given an initial voltage during an integrating period.

Depending upon the gain of the first amplifier, there are cases where the output of the first integrator reaches a base voltage before the end of the integrating period or after the end of the integrating period. In such a case, the control means is operated so that the gain of the first amplifier is regulated. That is, when the output of the first integrator has reached the base voltage before the end of the integrating period, the gain is decreased because it is too large.

Also, when the output of the first integrator has reached the base voltage after the end of the integrating period, the gain is increased because it is too small. Finally, the output of the first integrator reaches the base voltage at the time of the end of the integrating time. The gain of the second amplifier is likewise regulated. Accordingly, even if the integrating period fluctuated, the integration results would be the same with respect to a fixed input signal. Also, if the reference voltage and the base voltage are constant, the fluctuation of the semiconductor device process will not need to be considered because the initial values of the gains of the first and second amplifiers can be compensated even if the initial values are arbitrary.

Note that the present invention may also comprise: (1) a first integrator integrating a reference voltage during an integrating period, (2) a second integrator integrating an input signal during the integrating period, and (3) control means for outputting a control signal to the first integrator so that an output of the first integrator and the integrating period meet a predetermined relationship, and for controlling the second integrator by the control signal.

BRIEF DESCRIPTION OF THE DRAWINGS

FIG. 3 is a block diagram illustrating the overall structure of an integrator capable of compensating its output, according to the present invention.

FIG. 4 is a block diagram showing the details of the control circuit 7 of FIG. 3.

FIGS. 5a through 5g are diagrams showing the signal waveforms corresponding to the circuit elements in FIG. 4.

DESCRIPTION OF THE PREFERRED EMBODIMENT

Figure 1:
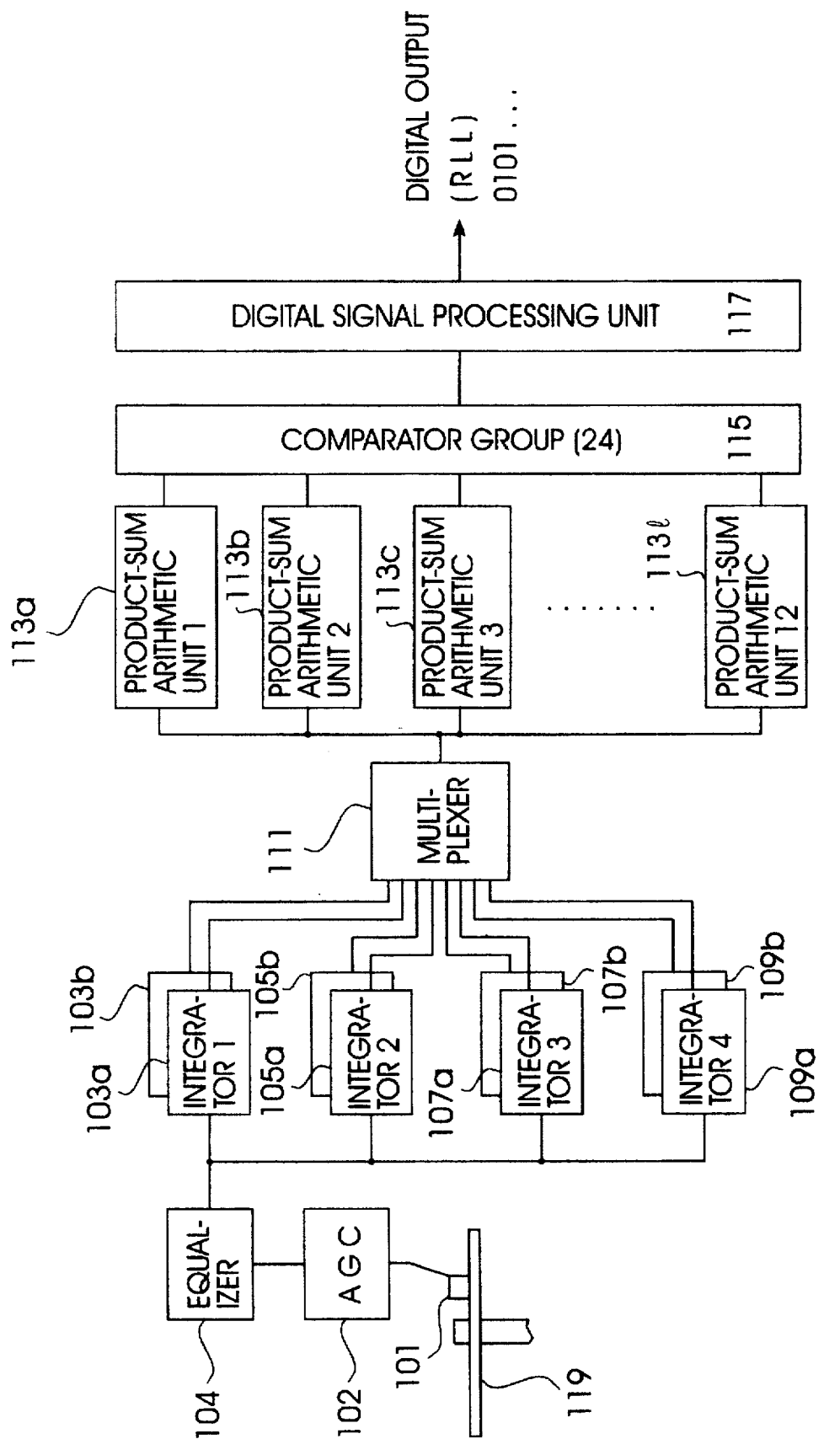
FIG. 1 illustrates a block diagram of a symbol detection channel in which the integrator of the present invention may be used.
Figure 2A:
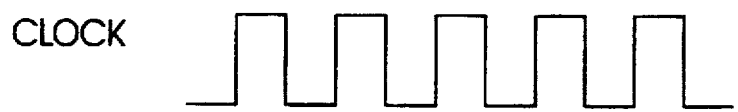
FIG. 2a shows a clock signal used by the integrators of FIG. 1.
Figure 2B:
FIG. 2b shows an analog signal which is inputted to the integrators of FIG. 1.
Figure 2C:
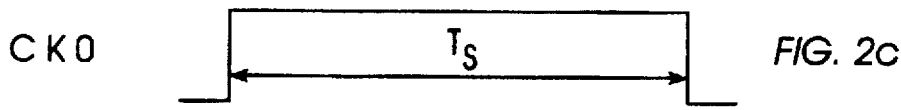
FIG. 2c illustrates a signal representative of the integrating period and the polarity of the integrator 1 of FIG. 1.
Figure 2D:
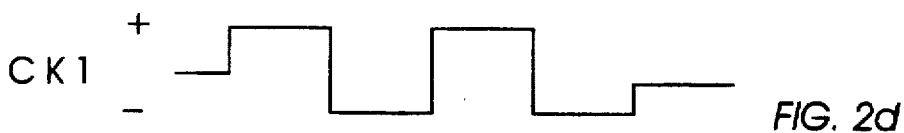
FIG. 2d illustrates a signal representative of the integrating period and the polarity of the integrator 2 of FIG. 1.
Figure 2E:
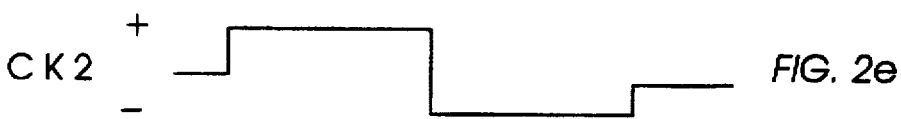
FIG. 2e shows a signal representative of the integrating period and the polarity of the integrator 3 of FIG. 1.
Figure 2F:
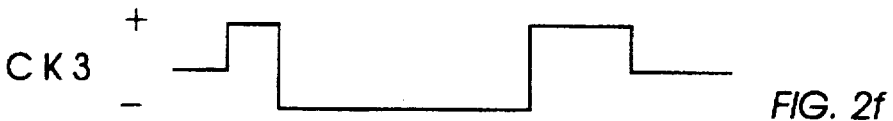
FIG. 2f shows a signal representative of the integrating period and the polarity of the integrator 3 of FIG. 1.

FIG. 3 illustrates a simplified block diagram of an integrator capable of compensating its output, in accordance with the invention. The integrator includes amplifiers 1 and 2, switches 3 and 13 that are turned on during an integration period $T_r$, capacitors 5 and 15 that are used during the integration, and a first control circuit 7 for controlling the gains of the amplifiers 1 and 2. The integrator further includes a capacitor 9 that acts as a low pass filter with respect to the output of the control circuit 7, and a second control circuit 14. The control circuit 14 receives any of the signals CK0, CK1, CK2, and CK3 shown in FIGS. 2c through 2f and charges or discharges the capacitor 15 by the polarity of the received signal.

A reference signal $V_1$ is input to the amplifier 1. The integrating period $T_s$ represents the time needed for reading out a predetermined bit (or symbol) from a magnetic disk. The initial voltage of the capacitor 5 has been set to a reference voltage $V_{ref}$. Therefore, when the switch 3 is on, the output voltage $V_o$ of the integrator changes from $V_{ref}$ to a target voltage $V_t$. In corresponding to the change in the output voltage $V_o$, the control circuit 7 generates a regulating voltage $V_g$ and outputs it to the amplifiers 1 and 2. An input signal $V_2$ to the amplifier 2 is integrated during the same integrating period $T_s$. The polarity of the integration is shown in FIGS. 2c through 2f. Furthermore, the second control circuit 14 charges or discharges the capacitor 15 in correspondence with this polarity. The result of the integration is output for subsequent processing as $V_{o'}$. This integration result is output, for example, to the multiplexer 111 of FIG. 1, as previously described.

The operation of the circuit shown in FIG. 3 is described next. The output current $I_o$ of the amplifier 1 is charged to the capacitor 5 during the integration period $T_s$. The output current $I_o$ is substantially determined by the input reference signal $V_1$ to the amplifier 1 and the gain $g_m$ of the amplifier 1, but it is slightly influenced by the power supply voltage of the amplifier 1 and temperature variations. If this fluctuation in the output current $I_o$ is expressed in terms of driving current $I_d$, the output current $I_o$ will given as $I_o = g_m \times V_1 + I_d$. From the equation $Q = C \times V$, where Q represents the charge stored by a capacitor having a capacitance $C_o$ and voltage $V_o$, the following equation is established:

$$(g_m \times V_1 + I_d) \times T_s = C_o \times V_o = C_o \times (V_t - V_{ref})$$

Assuming the input reference signal $V_1$ and the target voltage $V_t$ have been fixed to constant values, and that the value of the capacitor 5 is constant, the gain $g_m$ of the amplifier 1 is obtained as follows.

$$g_m = A/T_s - B \times I_d$$

where $A = (C_o \times (V_t - V_{ref}))/V_1$
and $B = 1/V_1$

The above equations mean that the gain $g_m$ of the amplifier 1 needs to be automatically controlled so that the voltage displacement of the output $V_o$ becomes constant $(V_t - V_{ref})$ with respect to the variation in the integrating period $T_s$ and the fluctuation in the output current $I_o$.

If it is assumed that the amplifiers 1 and 2 have the same characteristic, the gains $g_m$ of the amplifiers 1 and 2 will be varied with the output $V_g$ of the control circuit 7. Generally, since the amplifiers 1 and 2 are implemented on the same semiconductor chip, the assumption that the two amplifiers have the same characteristic is typically valid. The control circuit 7 generates $V_g$ so that the voltage displacement of the output $V_o$ becomes $(V_t - V_{ref})$ at the period $T_s$, which is fed back to the amplifiers 1 and 2. With such an arrangement, the gains of the amplifiers 1 and 2 become the same. Therefore, even if the read speed of the magnetic head from the magnetic disk fluctuated and $T_s$ became longer or shorter, the gains would be regulated so that the voltage displacement of the integrated value $V_o$, becomes $(V_t - V_{ref})$, if the input signal $V_2$ is constant.

Referring now to FIG. 4, there is illustrated a circuit diagram for an embodiment of the control circuit 7 shown in FIG. 3. A comparator 21 is connected to two AND circuits 23 and 25, which are connected to a charge pump circuit 27. The charge pump circuit 27 is constructed so that its output $V_g$ is output via a low pass filter constituted by the capacitor 9 shown in FIG. 3.

The operation of the circuit will now be described. The comparator 21 receives the output $V_o$ of the amplifier 1 and the target voltage $V_t$ as input signals, and makes the output $V_{cmpout}$ thereof active when the output $V_o$ reaches the target voltage $V_t$. The $V_{cmpout}$ of the comparator 21 is inputted to one input terminal of the AND circuit 23 and to one input terminal of the AND circuit 25. A signal EN-DEC, which remains high until the end of the integrating period $T_s$, is inputted to the other input terminal of the AND circuit 23. Therefore, if the output $V_o$ reaches the target voltage $V_t$ before the end of the integrating period $T_s$, then the output of the AND circuit 23 will also go high. On the other hand, a signal EN-INC which goes high after the end of the integrating period $T_s$, is inputted to the other input terminal of the AND circuit 25. The output $V_{cmpout}$ of the comparator 21 is connected to the AND circuit 25 through a NOT circuit. Therefore, if the output $V_o$ reaches the target voltage $V_t$ after the end of the integrating period $T_s$, then the output of the AND circuit 25 will go high until the output of the comparator 21 goes active after the end of the integrating period $T_s$.

Next, if the AND circuit 23 goes high, then a logic high signal will be inputted to the DECREMENT terminal of the charge pump 27 and the electric charges of the capacitor 9 will be discharged to ground. If, on the other hand, the AND circuit 25 goes high, then a logic high signal will be inputted to the INCREMENT terminal of the charge pump 27 and electric charges will be charged into the capacitor 9.

FIGS. 5a through 5g illustrate examples of the signal waveforms corresponding to the components shown in FIG. 4. In FIG. 5g, a reset signal first goes to a logic low at time T=0, which then starts the processing during an integrating period 29 ($T_s$). At this time, the voltage of the capacitor 5 has been set to $V_{ref}$ and the amplifier output $V_o$ rises with time, as shown by FIG. 5a. If the amplifier output $V_o$ reaches the target voltage $V_t$ before the end of the integrating period $T_s$, as shown by a line 30, then the output of the comparator 21 will also go to high, as shown in FIG. 5b. Since the signal EN-DEC (FIG. 5c) is also high, the output of the AND circuit 23 also goes high and therefore the DECREMENT input terminal of the charge pump circuit 27 also goes high. As a result, electric charges are removed from the capacitor 9 during a period 33, as shown in FIG. 5e. And, the electric voltage of the capacitor 9 is outputted to the amplifiers 1 and 2.

If, on the other hand, the amplifier output $V_o$ reaches the target voltage $V_t$ after the end of the integrating period $T_s$, as shown by a line 32 in FIG. 5a, then the AND circuit 25 will go high in relation to the signal EN-INC (FIG. 5d), until the output of the comparator 21 goes high after the time $T_s$. The INCREMENT input terminal of the charge pump circuit 27 will then go high. The electric charges are inputted to the capacitor 9 during period 34 of FIG. 5f. Also, the electric voltage of the capacitor 9 is outputted to the amplifiers 1 and 2.

Also, when the amplifier output $V_o$ shown in FIG. 5a reaches the target voltage $V_t$ just at the end of the integrating period $T_s$, as shown by a line 31, no output is outputted from the charge pump circuit 27 and there is no change in the output of the capacitor 9.

As described above, the voltage of $V_g$, which is a gain regulating signal, is increased or decreased so that the amplifier output $V_o$ changes as shown by the line 31 of FIG. 5a.

Although the embodiment as described above achieves the aforementioned objectives, the present invention is not limited to such an embodiment. For example, the switch 13 does not need be located at the position shown in FIG. 3, but it may be provided before the amplifier 2. Particularly, the polarity of the input signal $V_2$ is sometimes switched to plus or minus and integrated, so the switch 13 can also be installed together with a switch for changing the polarity of the input signal $V_2$. In addition, while a description has been made of a case where $V_g$ is determined by the charge pump circuit 27 and the capacitor 9 shown in FIG. 4, they can also be replaced with some other circuits which vary the outputs of the AND circuits 23 and 25 during the time the circuits 23 and 25 go high.

Figure 6:
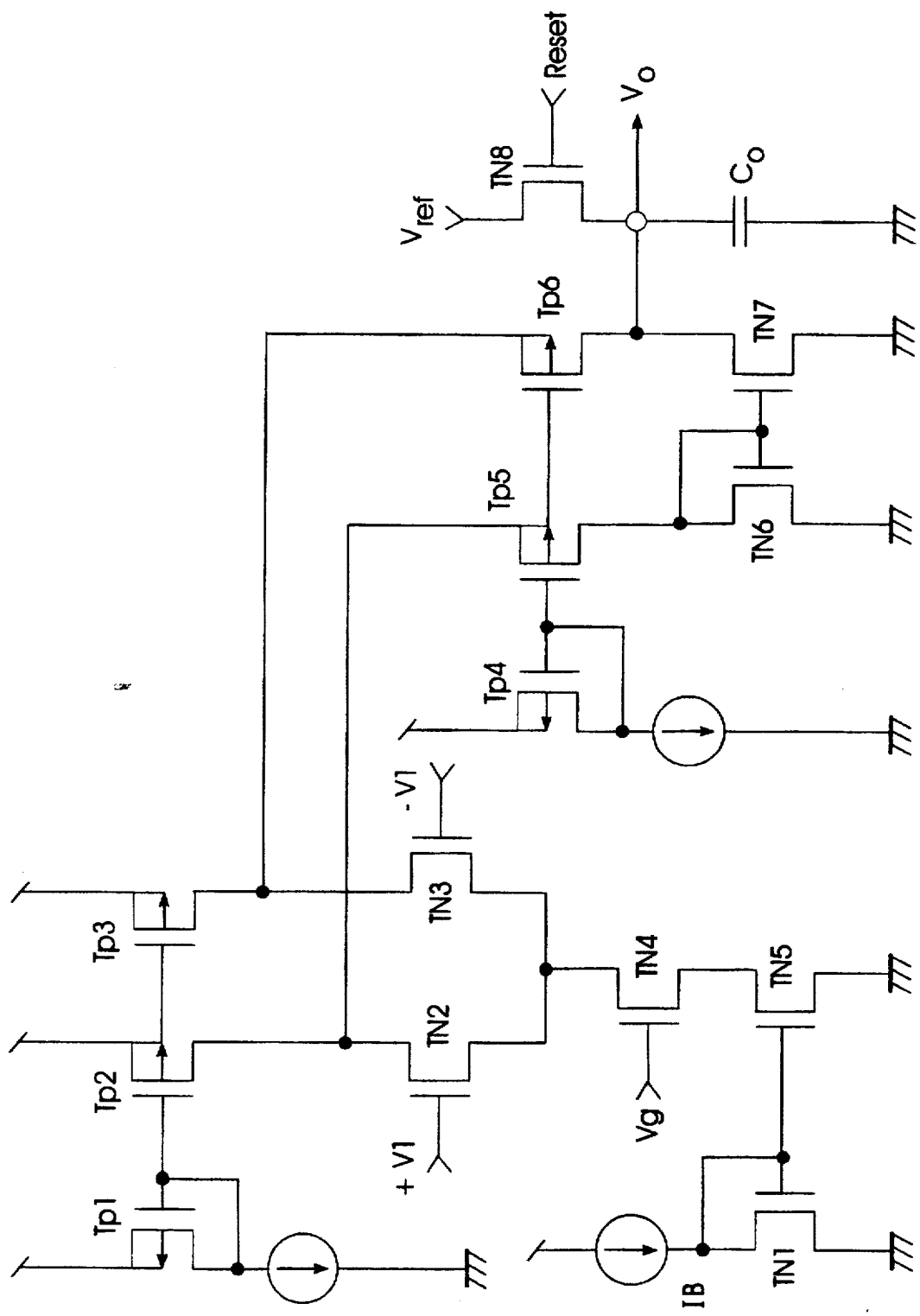
FIG. 6 is a circuit diagram illustrating the details of the amplifier 1 and the capacitor 5 of FIG. 3.

FIG. 6 shows the circuit diagram for an embodiment of the amplifier 1 and the capacitor 5 of FIG. 3. This circuit is a current-amplifying type CMOS amplifier consisting of a first-stage differential amplifier and a second-stage current mirror circuit. The feature of this circuit is that the gain of the amplifier is varied by $V_g$ from the control circuit 7. More specifically, $V_g$ is applied to the gate of an NMOS transistor (TN4) which determines the current of the differential circuit, and the current $I_B$ of TN1 and TN5 is limited by this, thereby varying the gain of the amplifier.

In summary, the invention provides an integrator which is capable of outputting the same output with respect to the same symbol (same bit pattern) independently of data reading speed, variations in a semiconductor process, fluctuations in a power supply voltage, and temperature changes.

The compensation for the aforementioned speed and semiconductor process can also be performed quickly and automatically.

And, if the integrator of the present invention is incorporated into the symbol detection channel shown in FIG. 1, high-speed signal processing can be performed. In this case, 8 integrators are used as shown in FIG. 1. Also, a single amplifier 1, a single switch 3, a single capacitor 5, a single control circuit 7, a single capacitor 9 are used, and 8 amplifiers 2, 8 switches 13, 8 second control circuits 14, and 8 capacitors 15 are used. A single output $V_g$ is input to the 8 amplifiers 2.

What is claimed is:

1. A signal integrator, comprising:

a first integrator having a first amplifier, for integrating a reference voltage during an integrating period;

a second integrator having a second amplifier, for integrating an input signal during said integrating period; and control means coupled to said first and second integrators for outputting a control signal, said control signal regulating a gain of said first amplifier and a gain of said second amplifier.

2. The integrator as set forth in claim 1, wherein said first integrator further has a capacitor and means for supplying an initial voltage to said capacitor.

3. The integrator as set forth in claim 1, wherein said control means comprises:

means for supplying a base voltage; and means for generating said control signal in correspondence with time until said output of said first integrator reaches said base voltage.

4. The integrator as set forth in claim 1, wherein said first amplifier and said second amplifier are equal in characteristic, and said control signal is inputted to said first and second amplifiers.

5. The integrator as set forth in claim 3, wherein said means for generating said control signal comprises:

a comparator for comparing said base voltage with said output of said first integrator;

means for determining when an output of said comparator is activated;

a capacitor; and means for charging or discharging said capacitor when said determining means determines that said output of said comparator is activated.

6. The integrator as recited in claim 1, wherein the output of the first integrator is generated based on the integrating period.

7. A magnetic disk signal processing unit, comprising:

a first integrator having a first amplifier, for integrating a reference voltage during an integrating period;

a plurality of second integrators each having a second amplifier, for integrating an input signal during said integrating period;

control means coupled to said first and second integrators for outputting a signal, said signal regulating a gain of said first amplifier and a gain of said second amplifiers;

a multiplexer connected to said plurality of second integrators;

a plurality of product-sum arithmetic units for receiving respective outputs of said plurality of second integrators through said multiplexer and performing predetermined product-sum arithmetics on said outputs;

a comparator for comparing the output of a product-sum arithmetic unit previously selected from among said plurality of product-sum arithmetic units using a previously set value; and means for removing an intersymbolic interference using an output of said comparator.

* * * * *